US009972120B2

(12) United States Patent
Sweet et al.

(10) Patent No.: US 9,972,120 B2
(45) Date of Patent: May 15, 2018

(54) SYSTEMS AND METHODS FOR GEOMETRICALLY MAPPING TWO-DIMENSIONAL IMAGES TO THREE-DIMENSIONAL SURFACES

(71) Applicants: Christopher Richard Sweet, Mishawaka, IN (US); James Christopher Sweet, Mishawaka, IN (US)

(72) Inventors: Christopher Richard Sweet, Mishawaka, IN (US); James Christopher Sweet, Mishawaka, IN (US)

(73) Assignee: University of Notre Dame du Lac, Notre Dame, IN (US)

( * ) Notice: Subject to any disclaimer, the term of this patent is extended or adjusted under 35 U.S.C. 154(b) by 118 days.

(21) Appl. No.: 13/849,258

(22) Filed: Mar. 22, 2013

(65) Prior Publication Data
US 2013/0249901 A1 Sep. 26, 2013

Related U.S. Application Data

(60) Provisional application No. 61/685,678, filed on Mar. 22, 2012, provisional application No. 61/732,164, (Continued)

(51) Int. Cl.
*G06T 15/04* (2011.01)
*G06T 17/00* (2006.01)

(52) U.S. Cl.
CPC .............. *G06T 15/04* (2013.01); *G06T 17/00* (2013.01); *G06T 2210/56* (2013.01)

(58) Field of Classification Search
CPC .................................. G06T 15/04; G06T 17/00
(Continued)

(56) References Cited

U.S. PATENT DOCUMENTS 5,412,765 A 5/1995 Yamron et al.
6,759,979 B2 * 7/2004 Vashisth et al. ......... 342/357.31
(Continued)

FOREIGN PATENT DOCUMENTS

EP      1160731          12/2001
EP      1160731   A2 *   12/2001   ............... G06T 9/00
WO      0159708          8/2001

OTHER PUBLICATIONS

International Search Report re PCT/US2013/033559, dated Jun. 20, 2013, 2 pgs.
(Continued)

*Primary Examiner* — Devona Faulk
*Assistant Examiner* — Hai Tao Sun
(74) *Attorney, Agent, or Firm* — Greenberg Traurig, LLP

(57) ABSTRACT

A method of mapping a two-dimensional image to a three-dimensional surface includes capturing data for a two-dimensional image and a three-dimensional structure. A process determines coincident points between the 2D image and the 3D structure and maps points on the 2D image to the 3D structure by assigning relative two-coordinate points from the two dimensional image to relative three-coordinate points of the three-dimensional structure. The mapping creates a 3D surface and texturing and removes superfluous data from the created three-dimensional surface to clean the mapped resultant.

7 Claims, 12 Drawing Sheets

Related U.S. Application Data filed on Nov. 30, 2012, provisional application No. 61/797,143, filed on Nov. 30, 2012.

(58) Field of Classification Search
USPC .......................................................... 345/419
See application file for complete search history.

(56) References Cited

U.S. PATENT DOCUMENTS

| | | | |
|---|---|---|---|
| 7,023,432 B2* | 4/2006 | Fletcher et al. | 345/419 |
| 7,689,019 B2 | 3/2010 | Boese et al. | |
| 2001/0016063 A1 | 8/2001 | Albeck et al. | |
| 2007/0146360 A1* | 6/2007 | Clatworthy | G06T 15/20 345/419 |
| 2008/0259073 A1* | 10/2008 | Lowe et al. | 345/419 |
| 2008/0310757 A1 | 12/2008 | Wolberg et al. | |
| 2009/0232355 A1* | 9/2009 | Minear et al. | 382/103 |
| 2010/0266220 A1 | 10/2010 | Zagorchev | |
| 2010/0328308 A1 | 12/2010 | Gamliel et al. | |
| 2011/0116718 A1 | 5/2011 | Chen | |
| 2011/0298800 A1* | 12/2011 | Schlichte et al. | 345/420 |
| 2012/0176380 A1* | 7/2012 | Wang et al. | 345/420 |
| 2013/0124159 A1* | 5/2013 | Chen et al. | 703/2 |

OTHER PUBLICATIONS

Written Opinion re PCT/US2013/033559, dated Jun. 10, 2013, 5 pgs.

International Preliminary Report and Written Opinion dated Sep. 23, 2014, re International Application No. PCT/US2013/033559, 6 pgs.

* cited by examiner

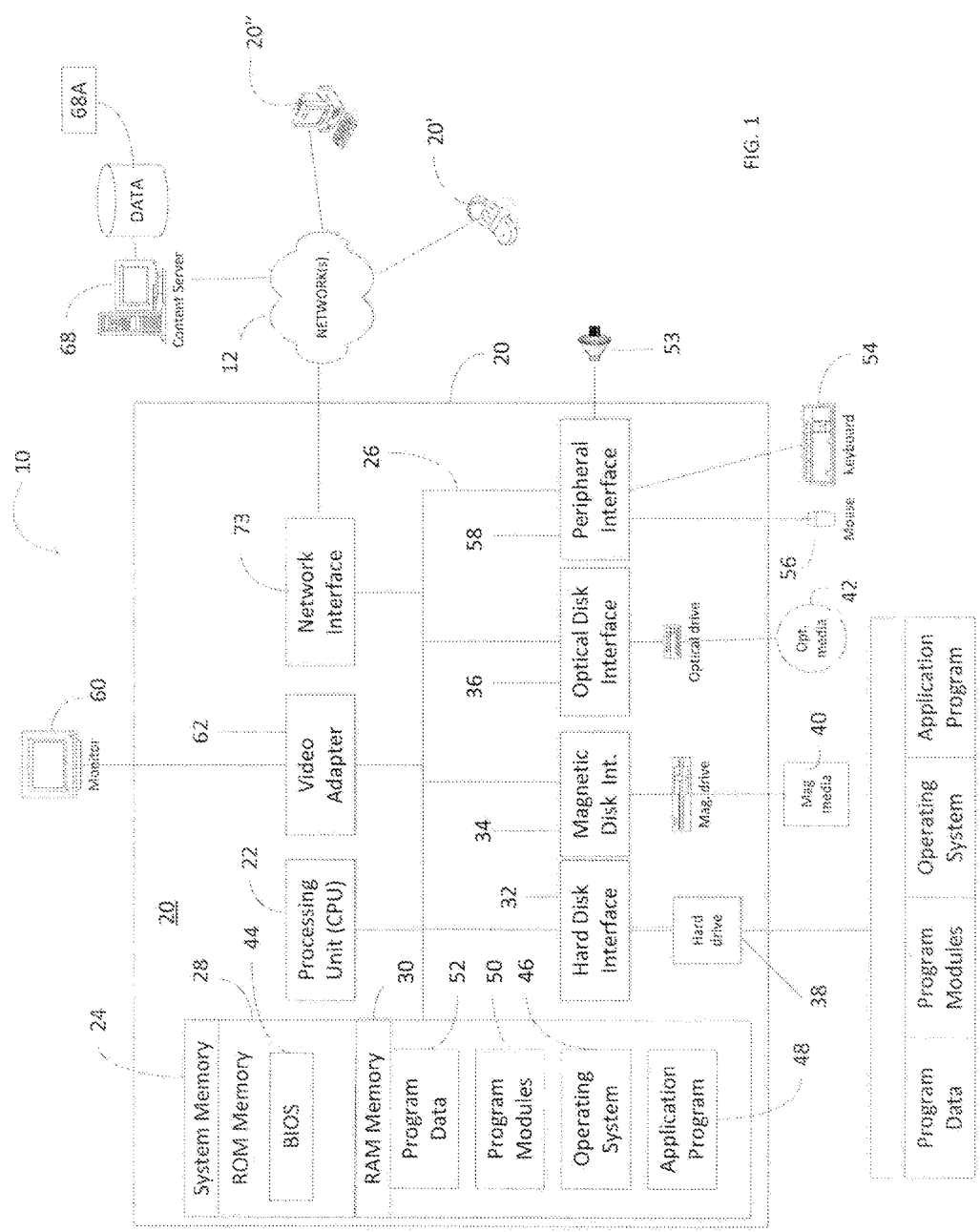

SYSTEMS AND METHODS FOR GEOMETRICALLY MAPPING TWO-DIMENSIONAL IMAGES TO THREE-DIMENSIONAL SURFACES

CROSS REFERENCE TO RELATED APPLICATION

This application is a non-provisional application claiming priority from U.S. Provisional Application Ser. No. 61/685,678, filed Mar. 22, 2012, entitled "Method of mapping a 2D image to a 3D surface", U.S. Provisional Application Ser. No. 61/732,164, filed Aug. 3, 2012, entitled "System and Method of Mapping a 2D Image to a 3D Structure", and U.S. Provisional Application Ser. No. 61/797,143, filed Nov. 30, 2012, entitled "Method of mapping a 2D image to a 3D surface", each of which are incorporated herein by reference in their entirety.

FIELD OF THE DISCLOSURE

The present disclosure relates generally to computer visualization and more particularly to systems and methods for geometrically mapping two-dimensional images to three-dimensional surfaces.

BACKGROUND OF RELATED ART

Texturing three-dimensional (3D) surfaces with two-dimensional (2D) graphics is commonplace in the field of computer visualization. For example, visualization is a rapidly advancing field which provides immersive environments that can be enhanced by employing 3D viewing hardware. The use of such environments is now commonplace in technical and scientific fields where the correct interpretation of data is vital in both diagnostics and extending the frontiers of knowledge. Such fields generally require geometrically correct rendering of data in contrast to many areas of the entertainment industry, and hence specialist techniques are required.

A point-cloud is a set of vertices in a three-dimensional coordinate system. These vertices are usually defined by X, Y, and Z coordinates, and typically are intended to be representative of the internal and external surface of an object. Point-clouds are most often created by 3D scanners. These devices measure in an automatic way a large number of points on the surface of an object, and often output a point-cloud as a data file. The point-cloud represents the set of points that the device has measured.

As the result of a 3D scanning process point-clouds are used for many purposes, including to create 3D CAD models for manufactured parts, metrology/quality inspection, post-acquisition analysis (e.g., engineers and/or scholars) and a multitude of visualization, animation, rendering and mass customization applications.

In one example, U.S. Pat. No. 5,412,765 describes a method for visualizing vector fields uses texture mapping for the vectors to create an animated vector field. The described methods utilize time lapse as a component. Specifically, vectors are textured with one dimensional texture maps composed of alternating visible and invisible segments. Successively applied texture maps differ from each other in order to create a moving line effect on the vectors being visualized. A fading effect is further provided by varying the intensity of the visible segments.

Meanwhile, U.S. Pat. No. 7,689,019 describes a method for registering a 2D projection image of an object relative to a 3D image data record of the same object, in which, from just a few 2D projection images, a 3D feature contained in an object, which is also identifiable in the 3D images, is symbolically reconstructed. The 3D feature obtained in this way is then registered by 3D-3D registration with the 3D image data record. The methods described identify three features on the target structure, form, surface, and centerline.

While the known systems and methods may work for their intended purposes, there is a known need in the art to provide improvements thereto.

BRIEF DESCRIPTION OF THE DRAWINGS

These and other features, aspects and advantages of the present disclosure will become better understood with regard to the following description, appended claims, and accompanying drawings.

FIG. 1 is a block diagram illustrating components of an example network system in which the disclosed systems and methods may be employed.

DETAILED DESCRIPTION

Figure 2A:
FIG. 2A shows an example architectural 3D point-cloud.

The following descriptions of various examples are not intended to limit the scope of the descriptions to the precise form or forms detailed herein. Instead the following descriptions are intended to be illustrative so that others may follow their teachings.

The present disclosure provides methods of determining the geometrically correct registration between a 2D image, or images, and the underlying 3D surface associated with them to allow automatic alignment of, for example, many images to many point-clouds. The requirement arises from technical and scientific fields, such as architecture and/or historical preservation, where, for example, a measurement from the underlying 3D data needs to be determined by observation of surface data. In this example, the present disclosure facilitates the combination of photographic data from multiple viewpoints with 3D data from laser scanners or Computer Aided Design (CAD) computer programs, to generate immersive environments where the user can query the underlying data by visual interpretation. Another example allows the combination of surface data, including internal surfaces, for biological specimens with CT scan data for diagnostic or educational purposes. In yet another example, the present disclosure allows for mapping of multiple images acquired from robotic tripods, such as a GigaPan tripod with a camera attached, to scanned data from scanners such as the Leica C10. In still another example, the present disclosure maps images from camera enabled scanners to point-clouds.

Acquisition of 3D data and the associated 2D surface data can be accomplished in a number of ways, depending on the problem. Where it is possible to use a single scan to obtain both 3D coordinates and surface images simultaneously, registration of the sets of data is guaranteed but with known technology, the object has to be of the order of 1 cm to 1 m in size. In many situations this is not possible, for example large architectural structures, landscapes, large area scenes, nano or biological-scale objects and data from devices such as CT scanners, etc.

In such cases, previous methods have manually adjusted the registration between the data sets visually, which does not guarantee the fidelity of registration over the full extents of the data sets and, in general, cannot correctly align the data sets. There also exist computer programs to approximately align the data to produce single point visualizations. In general this visualization cannot be rotated through all viewpoints and it is not possible to measure surface features based on the underlying 3D data.

In the present disclosure, 3D data, such as point-cloud data, is automatically combined with 2D surface data, which may include internal surfaces, such that the registration between the data sets, and hence the validity of observations and measurements based on them, is determined geometrically and maintained over the surface of interest. Where multiple sets of 2D data are available for the same surface area, the optimal set can be determined for each rendered pixel set. In addition, visual artifacts generally present with adjacent multiple images can be reduced. The surface images do not have to be produced from fixed viewpoints in relation to the 3D representation, or map directly to individual 3D features of the object, allowing the acquisition of data from the architectural to nano scales. This is particularly important from complex surfaces, for example those generated from biological specimens.

Still further, 3D points are culled from individual point-clouds, where a number of point-clouds are used, to reduce or eliminate overlap for optimal texturing. 3D points are culled from individual point-clouds to remove artifacts where the distance between adjacent points is large, indicating a real spatial separation. 3D points are culled to reduce their number, and hence the number of triangles, for efficiency, such that important features (such as edges) are preserved.

In one of the present disclosure, 3D data is combined with 2D surface images acquired from the same device, mapping images from camera enabled scanners to point-clouds. In another example of the present disclosure there is described a process of mapping multiple images acquired from robotic tripods, such as a GigaPan robotic tripod, to 3D scan data. The systems and methods disclosure herein also facilitates the combination of photographic data with 3D data from laser scanners to generate immersive environments where the user can query the underlying data by visual interpretation. As such, the examples disclosed have found particular use in, but are not restricted to, architectural and biological diagnostic fields.

With reference to the figures, systems and methods for mapping 2D images to 3D surfaces is now described. While not intended to be limiting, the systems and methods will be described in the context of a plurality of processing devices linked via a network, such as a local area network or a wide area network, as illustrated in FIG. 1. In this regard, a processing device 20, illustrated in the exemplary form of a computer system, is provided with executable instructions to, for example, provide a means for an operator, i.e., a user, to access a remote processing device, e.g., a server system 68, via the network to, among other things, distribute processing power to map 2D images to 3D surfaces. Generally, the computer executable instructions disclosed herein reside in program modules which may include routines, programs, objects, components, data structures, etc. that perform particular tasks or implement particular abstract data types. Accordingly, those of ordinary skill in the art will appreciate that the processing device 20 may be embodied in any device having the ability to execute instructions such as, by way of example, a personal computer, mainframe computer, personal-digital assistant ("PDA"), cellular or smart telephone, tablet computer, or the like. Furthermore, while described and illustrated in the context of a single processing device 20, those of ordinary skill in the art will also appreciate that the various tasks described hereinafter may be practiced in a distributed environment having multiple processing devices linked via a local or wide-area network whereby the executable instructions may be associated with and/or executed by one or more of multiple processing devices, e.g., in a cloud computing environment.

For performing the various tasks in accordance with the executable instructions, the processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and reading from or writing to a removable optical disk 42, such as a CD/DVD ROM or other optical media. The drive interfaces and their associated non-transient, computer-readable media allow for the non-volatile storage of computer readable instructions, data structures, program modules, and other data for the processing device 20. Those of ordinary skill in the art will further appreciate that other types of non-transient, computer readable media that can store data may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48, other program modules 50, and/or program data 52. Still further, computer-executable instructions may be downloaded to one or more of the computing devices as needed, for example, via a network connection.

The operator may enter commands and information into the processing device 20, e.g., a textual search query, a selection input, etc., through input devices such as a keyboard 54 and/or a pointing device 56. While not illustrated, other input devices may include a microphone, a joystick, a game pad, a scanner, a camera, etc. These and other input devices would typically be connected to the processing unit 22 by means of an interface 58 which, in turn, would be coupled to the bus 26. Input devices may be connected to the processor 22 using interfaces such as, for example, a parallel port, game port, Firewire, a universal serial bus (USB), etc. To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers, printers, 3D rendering hardware such as 3D glasses to separate right-left vision and autosteroscopic screens, etc.

The processing device 20 may also utilize logical connections to one or more remote processing devices, such as the server system 68 having one or more associated data repositories 68A, e.g., a database. In this regard, while the server system 68 has been illustrated in the exemplary form of a computer, it will be appreciated that the server system 68 may, like processing device 20, be any type of device having processing capabilities. Again, it will be appreciated that the server system 68 need not be implemented as a single device but may be implemented in a manner such that the tasks performed by the server system 68 are distributed to a plurality of processing devices linked through a communication network. Additionally, the server system 68 may have logical connections to other third party server systems via the network 12 and, via such connections, will be associated with data repositories and/or functionalities that are associated with such other third party server systems.

For performing tasks as needed, the server system 68 may include many or all of the elements described above relative to the processing device 20. By way of further example, the server system 68 includes executable instructions stored on a non-transient memory device for, among other things, handling mapping requests, etc. Communications between the processing device 20 and the server system 68 may be exchanged via a further processing device, such as a network router, that is responsible for network routing. Communications with the network router may be performed via a network interface component 73. Thus, within such a networked environment, e.g., the Internet, World Wide Web, LAN, or other like type of wired or wireless network, it will be appreciated that program modules depicted relative to the processing device 20, or portions thereof, may be stored in the memory storage device(s) of the server system 68.

Figure 2B:
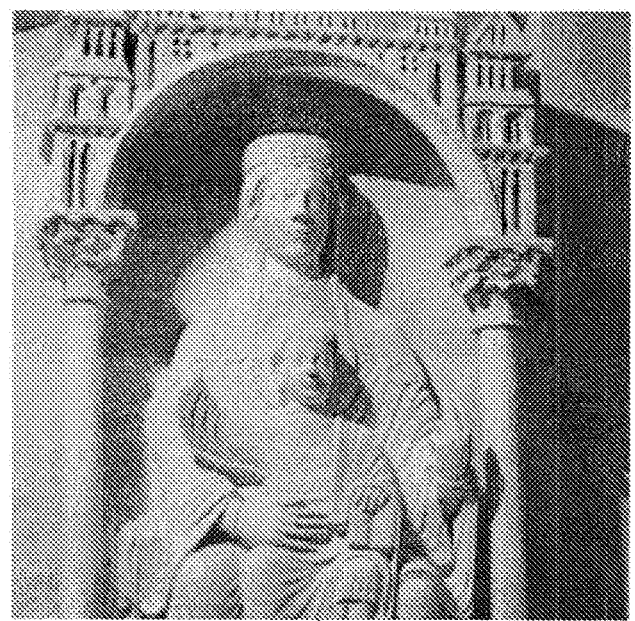
FIG. 2B shows an example 2D image corresponding to the example 3D point-cloud of FIG. 2A.

An example of an architectural 3D point-cloud 200 and corresponding 2D image 210 is illustrated in FIGS. 2A and 2B, respectively. In the present disclosure, a set of processes describe a method for geometrically determining the correct registration between a 2D image, or images, and the underlying 3D surface associated with the subject image(s). Still further, there is disclosed a process for mapping of a single image to a 3D surface point-cloud, as well as extending to multiple images from different viewpoints. Finally, there are described processes for extracting surface 3D point-clouds from general 3D data, such as for example, point-clouds, CT scans, or the like.

For simplicity of understanding, the following disclosure assumes that the user has a 3D point-cloud of surface points i.e., a collection of points in 3 dimensional space representing a surface which may be internal to the object, and a single 2D image which overlaps with the 3D data. Furthermore, the presently described systems and methods also assume the position of the camera is known in relation to the point-cloud. It will be appreciated, however, that the position of the camera need not be known in relation to the point-cloud and may be calculated and/or otherwise determined utilizing any suitable calculation method. Use of the present disclosure with multiple images and the generation of surface point-clouds from data, such as general point-clouds, CT scans, etc., will be discussed as well.

In the present example, the 3D point-cloud data may be obtained from any suitable source, including for instance, a scanner such as a Leica scanner available from Leica Geosystems AG, St. Gallen, Switzerland (for architectural use). Additionally, in this example, the 2D image may be selected from any suitable imaging source, such as an image from a set obtained using a GigaPan robotic tripod in association with an SLR camera, a high-resolution imaging system.

Mapping 2D Image to 3D Point-Cloud

Figure 3:
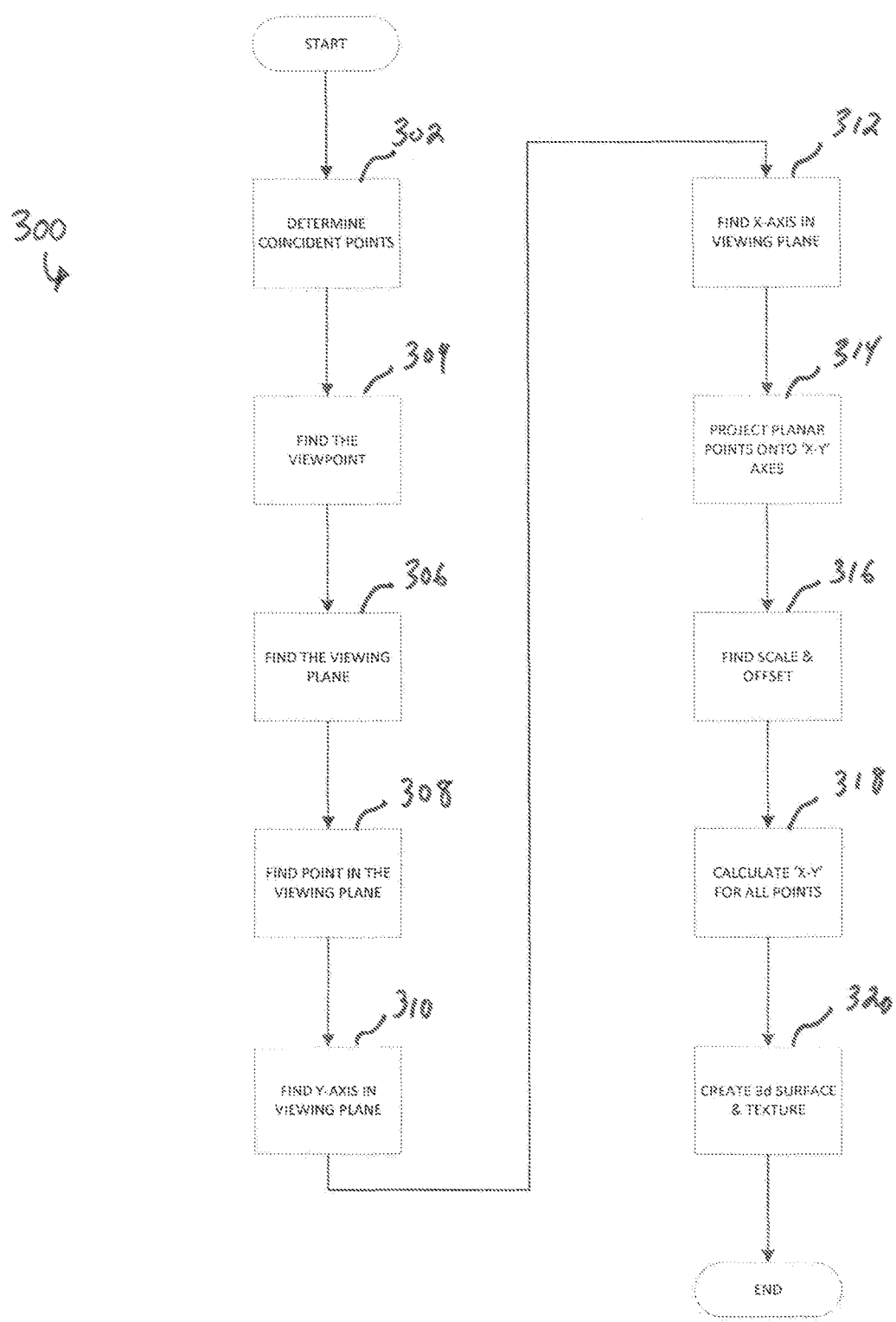
FIG. 3 illustrates an example process diagram for mapping an example 2D image to an example 3D point-cloud.
Figure 4:
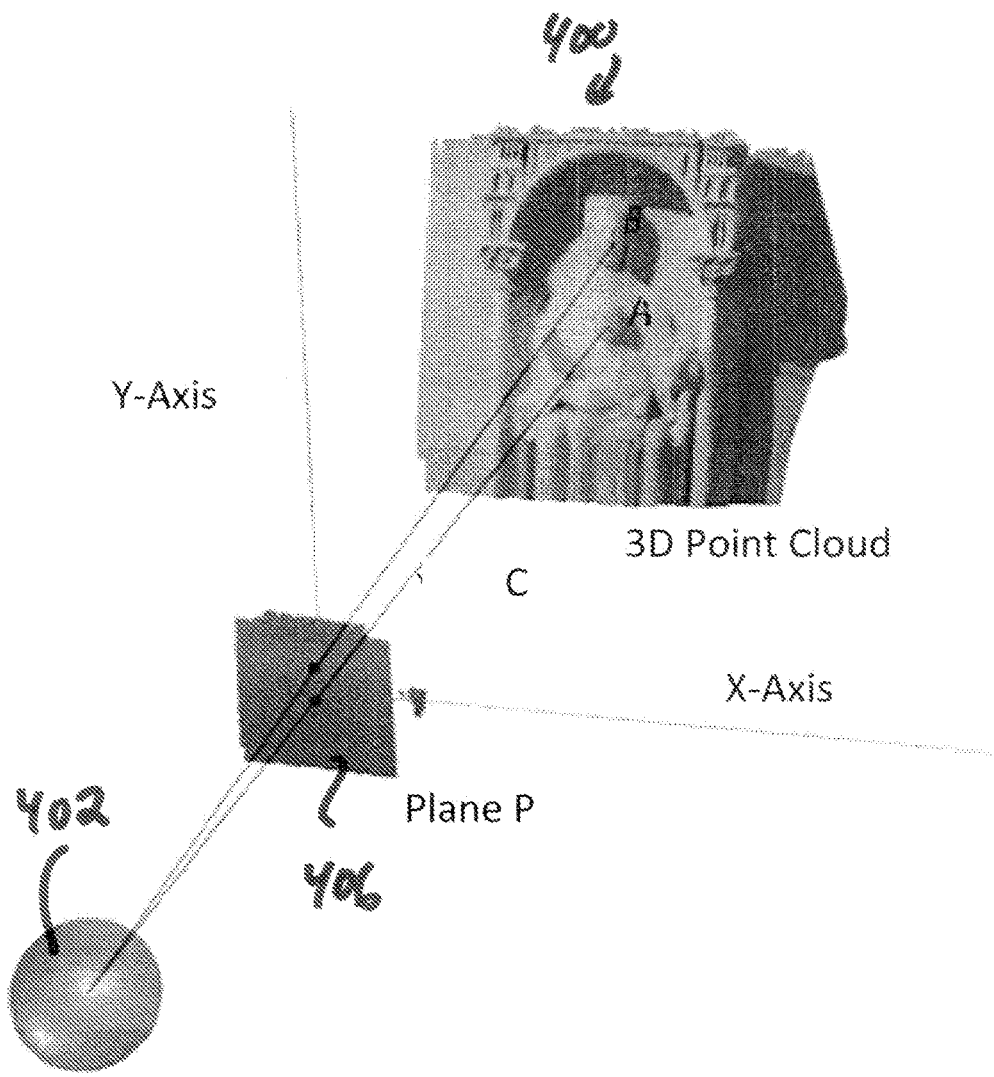
FIG. 4 illustrates an example block diagram of sample calculations utilized in the process of FIG. 3.

Turning to FIGS. 3 and 4, in one example of the present disclosure, a process 300 for mapping a 2D image to a 3D point-cloud is illustrated. In this example, processing starts at a block 302, wherein two coincident points between the 2D image and the 3D point-cloud are determined. Referring to FIG. 4, in a 3D point-cloud 400, two points, A and B in the 3D data 400, and the 2D image are determined. While not necessarily limiting, for his example, we will assume point A is closer to the center of the image 400. As illustrated, the 'noses' of the two statues are used.

Once the two coincident points are determined, the process 300 will continue with a block 304, wherein the process 300 finds the viewpoint. In other words, the process 304 finds the vector from the camera origin O (see reference 402, FIG. 4) to point A, denoted as vector C. Without loss of generality the process 300 assumes that point O is at the system origin.

$$O=(0,0,0) \qquad \text{Eq. 1}$$

Upon determination of the viewpoint, the process 300 continues with a determination of the viewing plane at a block 306. In this instance, the process 300 constructs a plane P (reference 406, FIG. 4) with a normal vector C without loss of generality. The example plane P (406) is constructed, at a distance 1 from the camera origin O (402). As such, using Eq. (1), a point on the plane is $\hat{A}=A/\|A\|$ and the vector from the origin O to point $\hat{A}$, $\hat{A}-O$, is a unit normal vector to the plane. Then for point p on plane P, using Eqn. (1), $$p \cdot (\hat{A}-O) - \hat{A} \cdot (\hat{A}-O) = p \cdot \hat{A} - 1 = 0 \qquad \text{Eq. 2}$$

Processing then continues with a block 608, wherein the process 300 finds the points in the viewing plane. Specifically, for each point P, on the 3D surface, the process draws a line $L_i$ from the camera origin O to the point $P_i$ and finds the point of intersection with the plane P, $PP_i$.[4] For point 1 on the line L and parameter t we have:

$$l = O + t(P_i - O) \quad \text{Eq. 3}$$

which intersects the plane P when:

$$t = \frac{-1 - O \cdot (\hat{A} - O)}{(P_i - O) \cdot (\hat{A} - O)} \quad \text{Eq. 4}$$

Using Eqs. 1-4, this reduces to $$PP_i = \frac{P_i}{P_i \hat{A}} \quad \text{Eq. 5}$$

The process 300 then finds the Y-axis in the viewing plane at a block 310. In this instance, the process defines a "vertical" plane VP containing the vector C, and finds the line Y where this plane intersects the plane P. This axis will be the "y-axis" for the 2D image. In one example, this can be accomplished by adding a vertical offset $V_{offs}$ to point A to give a point $V = A + V_{offs}$, and a new point on the plane V can be calculated using the technique in Eq. 5.

$$\overline{V} = \frac{V}{V\hat{A}} \quad \text{Eq. 6}$$

And the process 300 requires a unit vector $\hat{Y}$ in the "y" direction from the plane origin, hence:

$$\hat{Y} = \frac{\overline{V} - \hat{A}}{\|\overline{V} - \hat{A}\|} \quad \text{Eq. 7}$$

The process 300 also finds the X-axis in the viewing plane at a block 312. In this instance, the line Y is rotated through 90 degrees clockwise in the plane P around the point where the vector C intersects the plane P. It will, however, be appreciated that the order and/or methodology for determining the Y and X axis may vary as desired. In this example, given $$O = (a,b,c), \overline{V} = (x,y,z) \quad \text{Eq. 8}$$

The process 300 finds a point H rotated around $\hat{A}$ in the plane P, (including u=a, v=b, w=c)

$$dotp = u*x + v*y + w*z,$$
$$H = (a*(v*v + w*w) +$$
$$u*(-b*v - c*w + dotp) + (-c*v + b*w - w*y + v*z),$$
$$b*(u*u + w*w) + v*(-a*u - c*w + dotp) +$$
$$(c*u - a*w + w*x - u*z), c*(u*u + v*v) +$$
$$w*(-a*u - b*v + dotp) + (-b*u + a*v - v*x + u*y)).$$

Requiring a unit vector $\hat{X}$ in the 'x' direction from the origin $\hat{A}$ hence $$\hat{X} = \frac{H - \hat{A}}{\|H - \hat{A}\|} \quad \text{Eq. 9}$$

Once the X and Y axis are determined, the process 300 continues at a block 314, wherein the planar points are projected onto the "x-y" axes. In this instance, each of the points $PP_i$ are projected onto the x and y axes to determine their 'x-y' coordinates $PPX_i$ and $PPY_i$. This may be determined through the equation:

$$PPX_i = (PP_i - \hat{A}) \cdot \hat{X}$$

$$PPY_i = (PP_i - \hat{A}) \cdot \hat{Y} \quad \text{Eq. 10}$$

At a block 316, the process finds the scale factors and offsets for the 2D image. For example, the process 300 calculates a scale factor S and the 'x-y' offsets $X_{off}$ and $Y_{off}$ for the 2D image. Given that points A and B on the 3D point-cloud 400 correspond to points $\hat{A}$ and $\hat{B}$ in the plane P, and assuming these points on the 2D image have 'x-y' coordinates $(a_x, a_y)$ and $(b_x, b_y)$, respectively, the process 300 can determine that $$S = \frac{\|B - A\|}{((b_x - a_x)(b_x - a_x) + (b_y - a_y)(b_y - a_y))^{\frac{1}{2}}} \quad \text{Eq. 11}$$

$$x_{off} = -a_x \quad \text{Eq. 12}$$

$$y_{off} = -a_y \quad \text{Eq. 13}$$

Once the scale factor S and the 'x-y' offsets are determined, the process calculates the actual 'x-y' coordinates for all points at a block 318. In this example, the process 300 may utilize the equation:

$$ppx_i = PPX_i * S - x_{off}$$

$$ppy_i = PPY_i * S -_{off} \quad \text{Eq. 14}$$

The process 300 may then create a 3D surface and texture using the 2D coordinates corresponding to each 3D point at a block 320. The surface texturing may be accomplished through any suitable procedure, including, for example, the procedure disclosure in Table 1. As an example the process 300 may draw a single OpenGL Quad (see Table 1) textured by one quadrilateral from the image (consisting of four adjacent points in the point-cloud). It will be understood that while the present example is provided in openGL, any suitable process may be utilized as desired. In the example disclosure herein, it is assumed for illustration purposes only that the top left point on the Quads 3D point-cloud is P2, the bottom left P10, the bottom right P11 and the top right P3, with corresponding actual 'x-y' coordinates of the image (ppx_2, ppy__2), (ppx_10, ppy_10), (ppx_10, ppy_10) and (ppx_3, ppy_3) (for ease of representation, the nomenclature has changed from $ppx_i$ to ppx_i in the example of Table 1).

TABLE 1

```
// Draw a Single Quad
glBegin(GL_QUADS);
    //set normal
    glNormal3f(normal.x( ), normal.y( ), normal.z( ));
    glTexCoord2f (ppx_2, ppy_2);
    glVertex3f(top_left_position.x( ),
    top_left_position.y( ),
        top_left_position.z( ));          //
    Top Left glNormal3f(normal.x( ), normal.y( ),
    normal.z( )); glTexCoord2f (ppx_10, ppy_10));
    glVertex3f(bottom_left_position.x( ), bottom_left_position.y( ),
        bottom_left_position.z( ));      //
    Bottom Left glNormal3f(normal.x( ), normal.y( ), normal.z( ));
    glTexCoord2f (ppx_11, ppy_11));
    glVertex3f(bottom_right_position.x( ),
    bottom_right_position.y( ),
        bottom_right_position.z( ));     //
    Bottom Right glNormal3f(normal.x( ), normal.y( ), normal.z( ));
    glTexCoord2f (ppx_3, ppy_3));
    glVertex3f(top_right_position.x( ),
    top_right_position.y( ),
        top_right_position.z( ) );        // Top Right
glEnd( );
```

In the example Quad textured process, The vector "normal" represents a normal vector to the Quad for the calculation of lighting effects and can be found as:

$$\text{normal} = (P_{10} - P_2) \times (P_3 - P_2) \qquad \text{Eq. 15}$$

wherein X is the cross product.

Mapping Multiple Overlapping Images

The processes described herein can be extended to multiple images by considering each image separately. Where images overlap, however, the process 300 needs to choose the optimal image section to render. Specifically, image overlap can be advantageous during data capture to ensure continuity of data over the entire surface of interest, i.e. all 3D points are associated with image data. Overlapping images also allow fill-in of areas that would be hidden by other features of the object being rendered.

Figure 5:
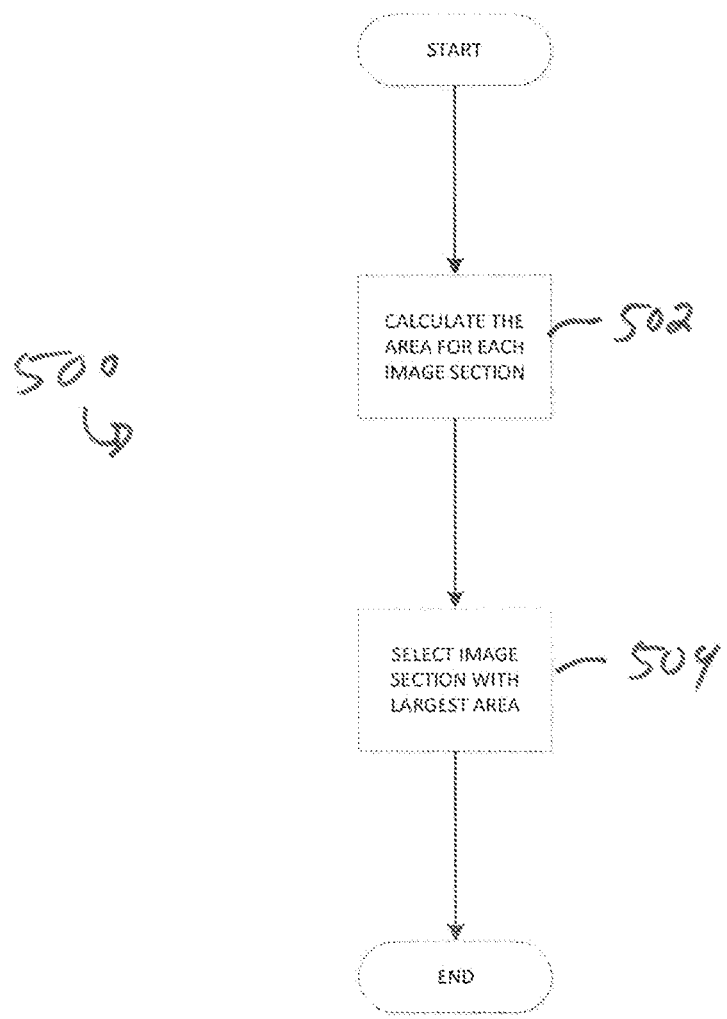
FIG. 5 illustrates an example process which allows for the blending of image date and the removal of visual artifacts.

Referring then to FIG. 5, there is presented a process 500 which allows for the blending of image data and the removal of visual artifacts at a block 504. In this example, the process 500 first calculates the areas for each corresponding image section, generally a triangle or quadrilateral, for the adjacent 3D points of interest at a block 502. The area A can be calculated for a triangle with vertices V0, V1, V2 as $$A = \frac{1}{2} \|(V_1 - V_0) \times (V_2 - V_1)\| \qquad \text{Eq. 16}$$

for 2D coordinates with $V_i = (x_i, y_i)$ $$A = \frac{1}{2} |(x_1 - x_0)(y_2 - y_0) - (x_2 - x_0)(y_1 - y_0)| \qquad \text{Eq. 17}$$

For example, given images $I_1$ and $I_2$ with areas $A_1$ and $A_2$, if $A_2 \geq A_1$ the process 500 will use the section from image $I_2$, else the process will use the section from $I_1$.

The process 500 may also select the image section with the largest area after adding a random perturbation to the area. In this instance, the process 500 allows 'blending' of the images to prevent artifacts such as image interface lines. Using the nomenclature from Equations 16 and 17, if $A_2 + R \geq A_1$, the process 500 uses the section from image $I_2$, else the process uses the section from $I_1$, for random variable R, which may preferably be determined with zero mean and known distribution.

Still further, the process 500 may select the image section with the largest area up to some error E, and if the areas are within some chosen error E, merge the image data during texturing. This process allows the 'blending' of the images to prevent artifacts such as image exposure level/color differences. In this example, if $A_2 > A_1 + E$, the process 500 uses the section from $I_2$, and if $A_1 > A_2 + E$, the process 500 uses the section from $I_1$. Else, the process 500 blends the sections from $I_1$ and $I_2$. Blending can be accomplished utilizing any suitable blending procedure, including, for example, an example OpenGL as shown in Table 2.

TABLE 2

```
glBindTexture(GL_TEXTURE_2D, texture[0]); // Select Texture 1 (0) glBegin(GL_QUADS); // Begin Drawing the Quad
...
glEnd( );
glBlendFunc(GL_SRC_ALPHA, GL_ONE); // Set Blending Mode To Mix Based On SRC Alpha glEnable(GL_ALPHA);
glBindTexture(GL_TEXTURE_2D, /*your alpha channel texture*/ texture[2]); // Select Texture 2 (0) glBegin(GL_QUADS); //
Begin
Drawing the Quad
...
glEnd( );
```

The example process illustrated in Table 2 effectively finds the image that is most closely aligned with the area defined in the 3D point-cloud, but also allows blending of image data to reduce artifacts.

Determination of the Surface 3D Point-Cloud from General 3D Data

Figure 6:
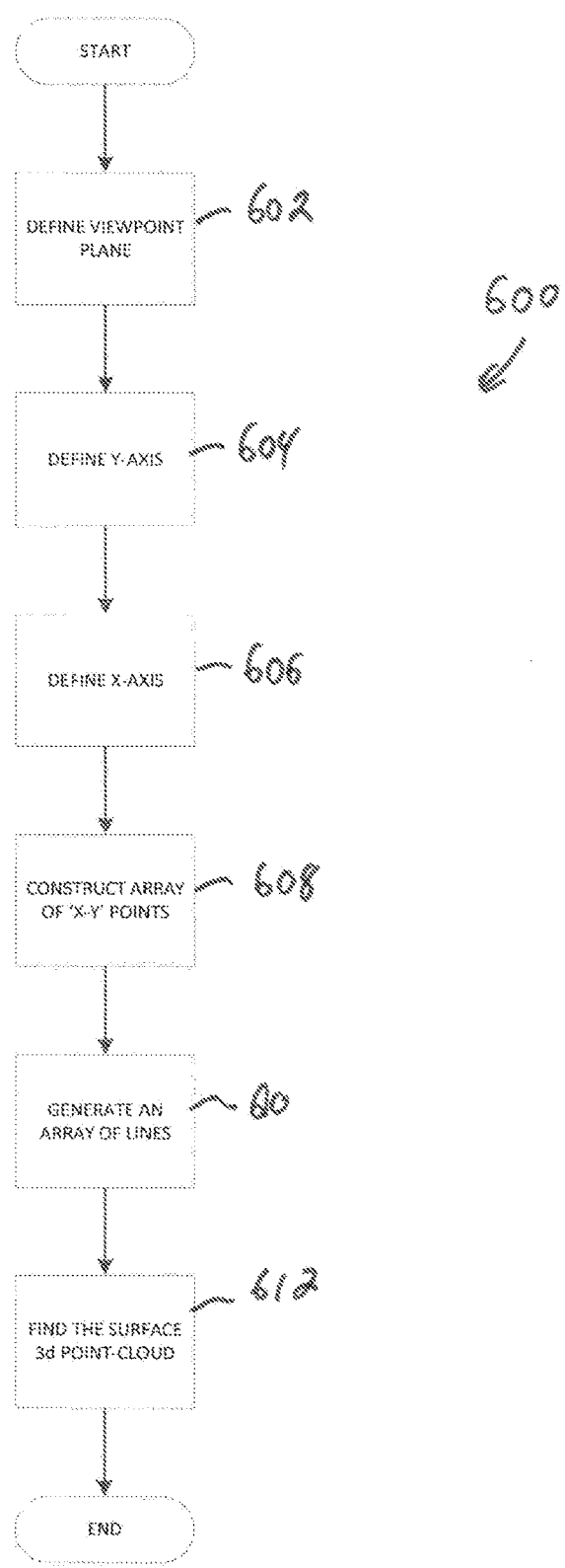
FIG. 6 illustrates an example of the determination of surface 3D point-cloud data from general 3D data.

Some data, for example computed tomography (CT scan), may contain general 3D coordinates not restricted to surface points of the object. In such instance, the 3D surface point-cloud can be extracted from the data utilizing a process 600 as illustrated in FIG. 6. It will be appreciated that the process 600 assumes the camera position and viewpoint is known, but it will be understood that in various examples, the camera position and/or viewpoint can be determined as needed by one of ordinary skill in the art.

In the example process 600, the viewpoint plane is first defined at a block 602. In this process, a plane P is constructed with the camera viewpoint (e.g, a vector describing the viewing direction of the camera) vector A as a normal plane. Assuming without loss of generality that the camera is positioned at the origin and the plane P is at a distance 1 from the camera. Using these assumptions, a point on the plane is $\hat{A} = A/\|A\|$ and $\hat{A}$ is also unit normal vector to the plane. Then for a point p on plane P $$p \cdot \hat{A} - 1 = 0 \qquad \text{Eq. 18}$$

Once the viewpoint plane is defined, the example process 600 defines the Y-axis at a block 604. In this example, the process 600 defines a camera 'vertical' plane VP containing a vector A, and finds the line Y, where this plane intersects the plane P. This intersect will be considered the 2D image 'y' axis. As previously noted, this can be accomplished by adding a vertical offset $V_{offs}$ to point A to give point $V=A+V_{offs}$, and a new point on the plane V can be calculated using the technique noted in Eq. 5.

$$\bar{V} = \frac{V}{V \cdot \hat{A}} \quad \text{Eq. 19}$$

For a point y and parameter t on the line y, the process concludes $$y = \hat{A} + t(\bar{V} - \hat{A}) \quad \text{Eq. 20}$$

Once the y-axis is determined, the process 600 performs a step of determining the x-axis at a block 606. As with the previous example, the x-axis may be determined through the rotation of the line y through 90 degrees clockwise in the plane P around the point where the vector A intersects the plane P. This line X is the x-axis. Given that:

$$O=(a,b,c), \bar{V}=(x,y,z) \quad \text{Eq. 21}$$

The process 600 can then find point H rotated around O in the plane P (utilizing u=a, v=b, w=c)

$$dotp = u*x + v*y + w*z,$$
$$H = (a*(v*v + w*w) +$$
$$u*(-b*v - c*w + dotp) + (-c*v + b*w - w*y + v*z),$$
$$b*(u*u + w*w) + v*(-a*u - c*w + dotp) +$$
$$(c*u - a*w + w*x - u*z),$$
$$c*(u*u + v*v) + w*(-a*u - b*v + dotp) +$$
$$(-b*u + a*v - v*x + u*y)).$$

For a point x and a parameter t on the line x, it can be determined that $$x = \hat{A} + t(H - A) \quad \text{Eq. 22}$$

Once the x and y axes are defined, the process 600 continues with the construction of an array of 'x-y' points on the plane at a block 608. In this step, the array is constructed with points on the plane given by the equation:

$$G_{ij} = \hat{A} + i\Delta t(H - \hat{A}) + j\Delta t(\bar{V} - (\hat{A} + i\Delta t(H - \hat{A}))) \quad \text{Eq. 23}$$

for grid size parameter $\Delta t$ and the range of i, j determined by the model size.

Upon construction of the array, the process 600 may then generate an array of lines from the viewpoint through each array point in the plane at a block 610. In this step, for each $G_{ij}$, the process 600 generates a line $L_{ij}$ consisting of points given by the equation:

$$L_{ij} = tG_{ij} \quad \text{Eq. 24}$$

for a parameter t.

After generating the array of lines, the process 600 can find the surface of the 3D point-cloud at a block 612. In this example, to perform the step, the process 600 finds the first intersection of each line $L_{ij}$ with the model data (such as non-zero CT scan data) and/or finds the points $P_k$ in the 3D point-cloud set which are within some distance E of each line $L_{ij}$ but closest to the origin O. This data represents the surface point-cloud with respect to the viewpoint (e.g., the camera view). In this example, the distance d from a point x to a line $L_{ij}$ is given by the equation:

$$d = \frac{\|x \times (x - G_{ij})\|}{\|G_{ij}\|} \quad \text{Eq. 25}$$

The solution for the index of the point-cloud data can be determined as:

$$\underset{k}{\text{argmin}} = \frac{\|P_k \times (P_k - G_{ij})\|}{\|G_{ij}\|} \quad \text{Eq. 26}$$

It will be appreciated by one of ordinary skill in the art that while the process 600 is described as being well suited to find surface point-cloud date, the process 600 can also be utilized and extended to finding surface features within the object for such object as CT scans by considering the density with the scan itself.

Culling 3D Point-Clouds

As will be appreciated, scanning complex structures can generate artifacts where adjacent points in the scanner data have significant difference in distance from the scanner. In the case of multiple scans this can lead to important surface data being hidden behind 'stretched' data from overlapping scans. For correct texture registration may be vital that these artifacts be removed.

The collection of increasingly high resolution scanning data, and constraints due to current rendering hardware (especially the current choice of output device such as mobile devices), typically requires data reduction for the visualization of complex objects. The present disclosure provides intelligent processes for efficient point reduction for both of these cases while retaining important features such as object edges and relief features.

For example, for full coverage, objects oftentimes need to be scanned from multiple viewpoints and each scan will generally overlap due to a desire to cover the entire object and restrictions on scanning locations. To merge multiple scans it is desirable to retain the optimal scans (those that have the highest resolution for a given common area) and remove artifacts connected by near and far points that appear adjacent in the ordering of the point-cloud. The examples provides herein provide a parameterized method of removing "poor" triangles (points) from the list.

Figure 7A:
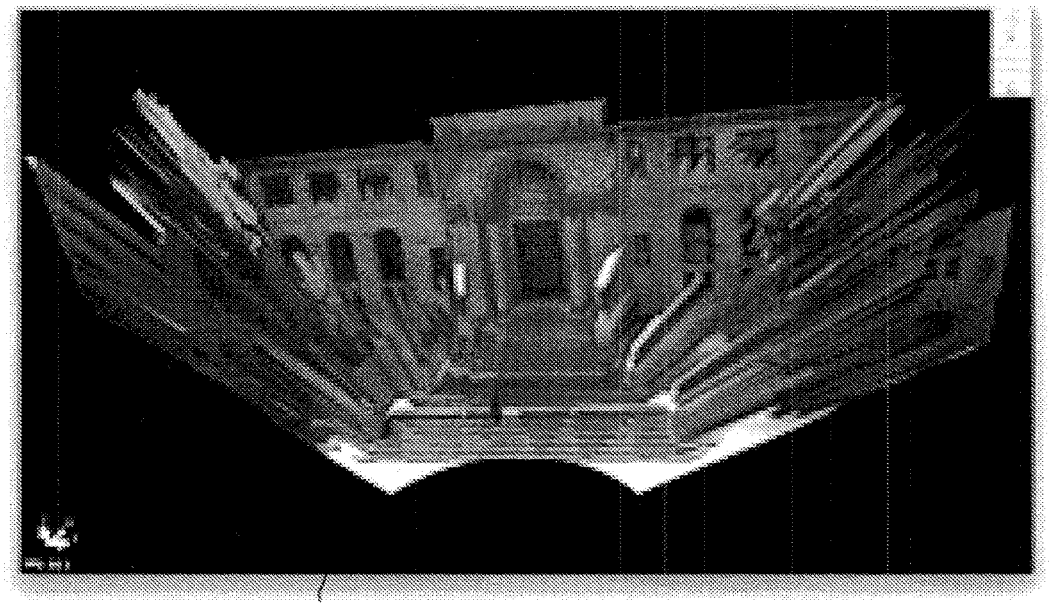
FIG. 7A illustrates an example image before any normalization and cleaning process.
Figure 7B:
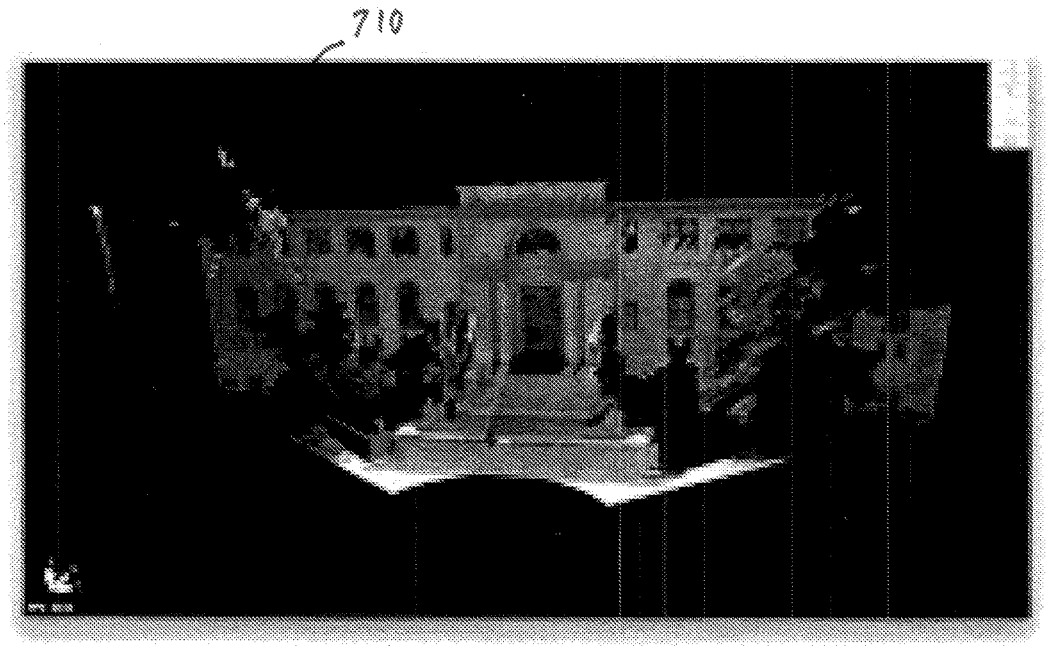
FIG. 7B illustrates the example image of FIG. 7A after an example normalization and cleaning process.

For example, referring to FIGS. 7A and 7B, there are illustrated examples of artifacts generated by near and far objects appearing adjacent to each other in the point-cloud. In FIG. 7A, an image 700 appears before any normalization and cleaning process. In the example of FIG. 7B, an image 710 appears after the triangle areas are calculated and normalized and removed if they are larger than a given threshold.

Figure 8B:
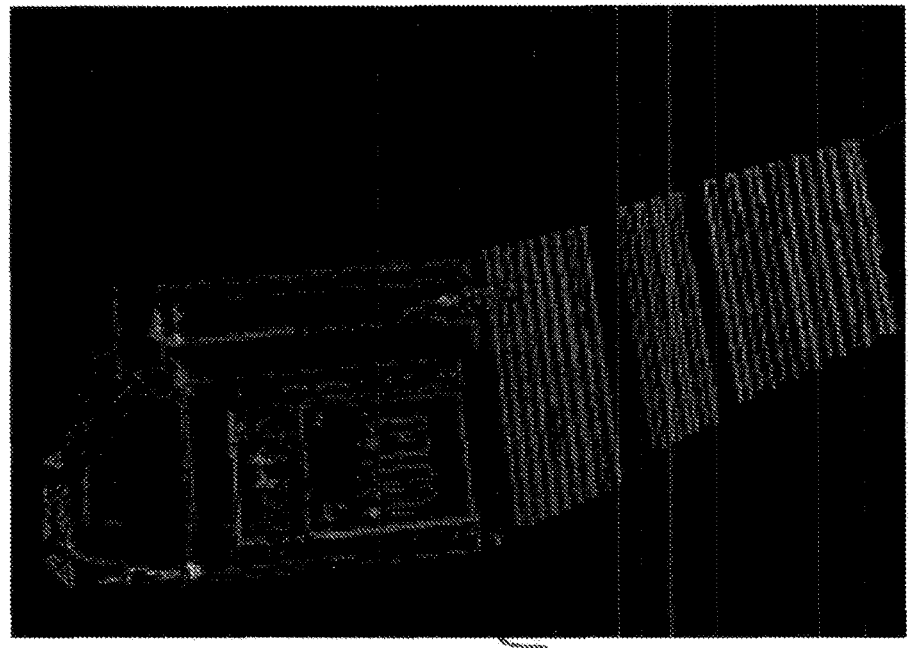
FIG. 8B illustrates the example image of FIG. 8A after an example compression process.
Figure 8A:
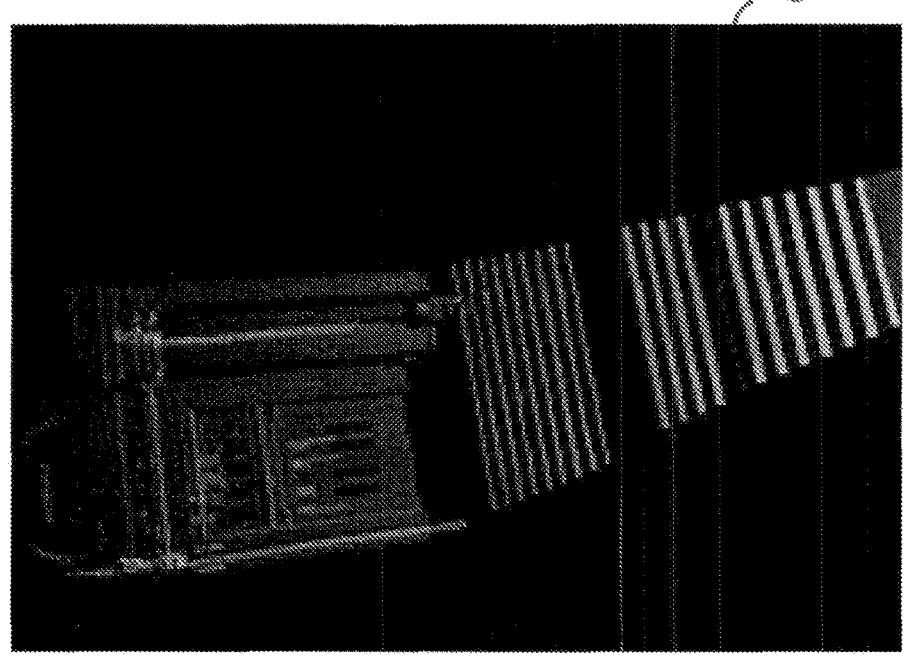
FIG. 8A illustrates an example image before compression.

Still further, point-clouds acquired by scanning can oftentimes be extremely large. To distribute merged data to computers 20 and mobile devices 20' via the network 14 typically requires that the data be compressed. The present disclosure includes example processes that can reduce the number of triangles (or points) in an "intelligent" manner such that important structural features, such as edges or relief features, are retained. For example, as illustrated in FIGS. 8A and 8B, an image 800 shows an non-compressed image, while an image 810 shows an example of compression by removal of points while retaining important structural features such as edges. In addition, the described methods are efficient with a computationally linear time complexity.

Figure 9:
FIG. 9 illustrates an example image showing the partial rendering using an example internal camera from a scanner.

Yet further, mapping the image data acquired from camera enabled scanners requires the solution to a geometric mapping and scaling algorithm. The present disclosure provided herein includes processes to accomplish this automatically. This contrasts with current methods where each image is manually aligned with the point-cloud. As such, the manual approach found in prior art is impractical for multiple scans each with many images, such as for example, a Leica Scanstation II, which can oftentimes produce more than 100 images for a full 360 degree scan. An example image 900 showing the partial rendering of the Arch of Septimius Severus at the Roman Forum is illustrated in FIG. 9.

Convert the Point-Cloud to a Surface

Without loss of generality the current disclosure assumes that the points are ordered in vertical (Z axis) lines with the zero vector representing points that are not included in the set (i.e. those removed by clipping). If this is not the case then the points must be ordered prior to analysis. Table 3 describes one example process used to find triangles that make up the surface to be textured. The example of Table 3 loops over all of the points and, for each point, tests the three other points adjacent to it to make a square (two triangles). If one point is missing we can form a single triangle and if more than one point is missing then no triangles are added.

TABLE 3

```
Def CalculateMesh( ):
    index=[ ]
    For i in range(Horizontal-1):
        For j in range(Vertical-1):
            lineA=(i*Vertical)+j;
            lineB=((i+1)*Vertical)+j;
            count=4;
            if Vertex[lineA]==Zero:
                count--
            if Vertex[lineB]==Zero:
                count--
            if Vertex[lineB+1]==Zero:
                count--
            if Vertex[lineA+1]==Zero:
                count--
            if count<3:
                continue
            if Vertex[lineA]==Zero:
                index.insert(Polygon(lineB,lineB+1,lineA+1))
                continue
            if Vertex[lineB]==Zero:
                index.insert(Polygon(lineA,lineB+1,lineA+1))
                continue
            if Vertex[lineB+1]==Zero:
                index.insert(Polygon(lineA,lineB,lineA+1))
                continue
            if Vertex[lineA+1]==Zero:
                index.insert(Polygon(lineA,lineB,lineB+1))
                continue
            index.insert(Polygon(lineA,lineB,lineB+1))
            index.insert(Polygon(lineB+1,lineA+1,lineA))
    return index;
```

Mesh Pruning to Remove "Poor" Triangles and Overlap

Referring to FIGS. 7A and 7B, when multiple scan locations are combined together and meshed, there are regions of the final model that have overlap from multiple scans. If these are mapped, the resolution of the scan (and hence the size of the triangles calculated) would be poor where the scanner is not directly aligned with the artifact. It would also be noticed artifacts in the form of very large (stretched) triangles where the angle that the scanner scanned from was not direct towards the model or where adjacent scan points have a large difference in distance from the scanner. These triangles are classified in the present disclosure as "poor" because to attain the highest resolution model, the present processes want as many small triangles as possible.

To overcome this issue, the present examples calculate the average compensated size of a triangle and then prune all triangles that are greater than a threshold. This threshold is, in one example, based off of the average compensated size and can be tuned to an individual model if required to achieve the greatest quality end result. The compensated area is calculated as the area divided by the distance from the scanner. In some situations it may be desirable to use the reduction algorithm without using compensation. In one instance, given points A, B, C representing the vertices of the triangle it can be determined that the area by forming vectors AB and AC, then the magnitude of the cross product AB×AC is twice the area of the triangle. To compensate for distance it may be divided by the magnitude of A.

In the examples illustrated in Tables 4 and 5 herein below, the disclosed processes compute the average triangle size (Table 4) and the "prune" any triangle above a predetermined threshold (Table 5).

TABLE 5

```
def FindAverage(Verticies,Polygons):
    average=0
    for poly in Polygons:
        bDiff=Verticies[poly.b]-Verticies[poly.a]
        cDiff=Verticies[poly.c]-Verticies[poly.a]
        size=CrossProduct(bDiff,cDiff).Magnitude( )*0.5
        average+=retVal/Verticies[poly.a].Magnitude
    return Absolute(average/len(Polygons))
```

TABLE 6

```
def Prune(Threshold,Verticies,Polygons):
    remaining=[ ]
    for poly in Polygons:
        bDiff=Verticies[poly.b]-Verticies[poly.a]
        cDiff=Verticies[poly.c]-Verticies[poly.a]
        size=CrossProduct(bDiff,cDiff).Magnitude( )*0.5
        area=size/Verticies[poly.a].Magnitude
        if area<Threshold:
            remaining.append(poly)
    return remaining
```

Point Reduction in O(N)

Referring to FIGS. 8A and 8B, to improve the speed of rendering mapped models, a process can be utilized to remove redundant points from the data set whilst keeping important features, such as edges. This process has time complexity of O(N).

Due to the structure of the data set (a grid of points where holes are symbolized by a predefined "empty" point) the process can test four squares of increasing sizes to see if all of the points within the four squares face the same direction. If the points do face the same way within a threshold, the four squares can be reduced into a single square. To test if the points in the four squares face the same way, the process calculates the average normal vector for each point and then compares the center point to each point via a comparison metric.

Figure 10:
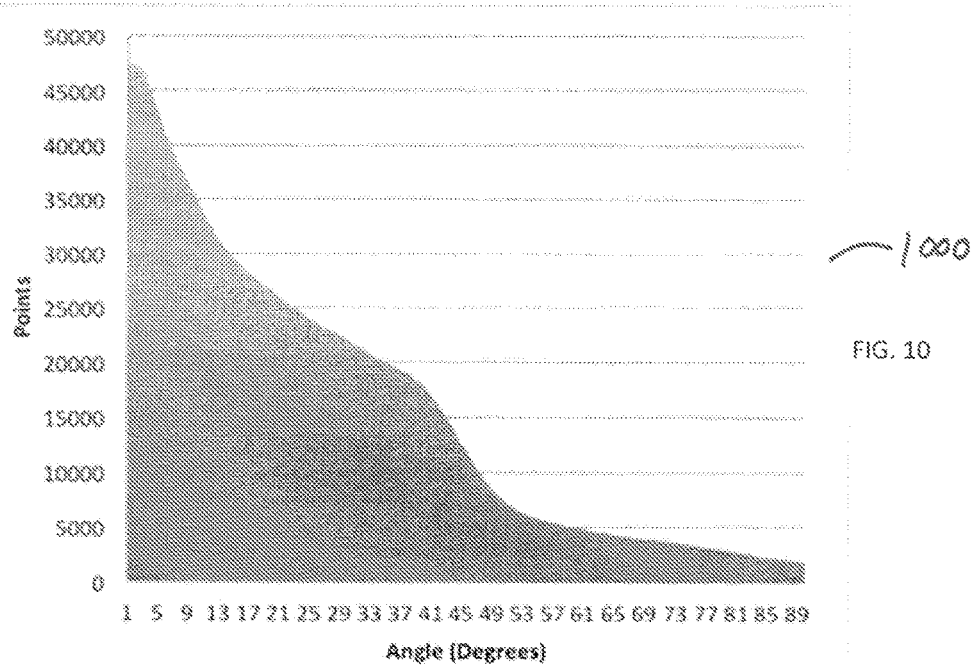
FIG. 10 is an example plot illustrating the remaining points after reduction using a center comparison process.

To test if a set of points is reducible, two comparison metrics are produced. The first comparison metric compares the angle between the center point and all eight surrounding points. If any of the surrounding points are greater than the threshold angle, then the process knows that the current set cannot be reduced and processing moves on. This method provides the most accurate final representation, as it does not remove any sets of points that do not all pass the test. This method provides reduction in triangles as shown in a plot 1000 illustrated in FIG. 10, which illustrates the remaining points after reduction where a center comparison is applied.

Figure 11:
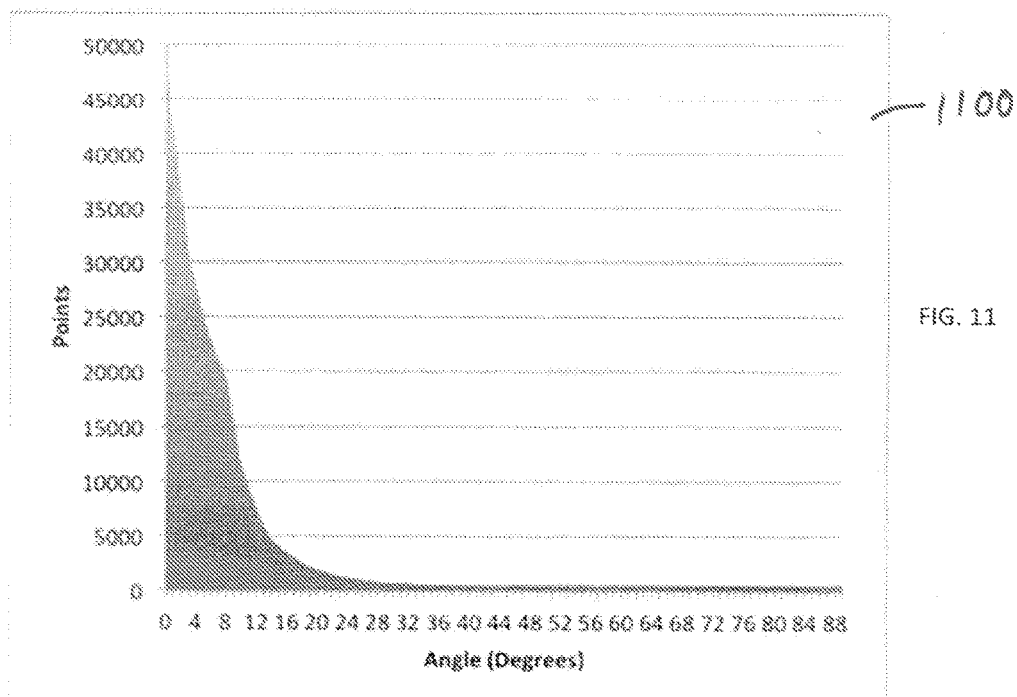
FIG. 11 is an example plot illustrating the remaining points after reduction using a two norm comparison process.

The second comparison metric compares the square root of the sum of the squares of all of the angles between the center point and all eight surrounding points. If this value is less than the threshold then the set can be reduced. This provides a less accurate representation due to the way that the two norm calculation works, however it allows for a much greater reduction of points as shown a plot 1100 illustrated in FIG. 11, which shows the remaining points after reduction where two norm comparisons are applied.

Examples of may be seen in Table 7.

TABLE 7

```
defPrunePoints(Threshold,Vertex,Polygons,Normal,Vertical,Horizontal,PointUses,Criteria):
    result=Polygons[:]pointUses=PointUses[:]
    step=2
    whilestep<max(Horizontal,Vertical):
        hStep=step/2
        pUses=[0]*len(Vertex)
        for i in range(hStep,Horizontal,step):
            if i + hStep>Horizontal:
            continue
            for j in range(hStep,Vertical,step):
                if j + hStep>Vertical:
                continue
                lineA=((i-hStep)*Vertical)+j
                lineB=(i*Vertical)+j
                lineC=((i+hStep)*Vertical)+j
                if point Uses[lineB]==4:
                normals=[
                        Normal[lineA+hStep],Normal[lineB+hStep],Normal[lineC+hStep],
                        Normal[lineA],Normal[lineB],normal[lineC],
                        Normal[lineA-hStep],Normal[lineB-hStep],Normal[lineC-hStep]
                        ]
                removable=true
                if Criteria == Center:
                for k in range(10):
                    top=dot(normals[4],normals[k])
                    bottom=normals[4],Magnitude( )*normals[k].Magnitude( )
                    angle=acos(top/bottom)*(180.0/3.14159)
                    if angle >= Threshold:
                        removable=falsebreak
                    else:
                        angle=0.0
                    for k in range(10):
                        ifk!=4:
                            top=dot(normals[4],normals[k])
                            bottom=normals[4].Magnitude( )*normals[k].Magnitude( )
                            angle+=pow(acos(top/bottom)*(180.0/3.14159),2)angle=sqrt(angle)/8
                    ifangle>=Threshold:
                        removable=falsebreak
                if removable:
                //RemoveBottomLeft
                result-=Polygon(lineA-hStep,lineB-hStep,lineB)
                result-=Polygon(lineB,lineA,lineA-hStep)
                //RemoveTopLeft
                result-=Polygon(lineA,lineB,lineB+hStep)
                result-=Polygon(lineB+hStep,lineA+hStep,lineA)
                //RemoveBottomRight
                result-=Polygon(lineB-hStep,lineC-hStep,lineC)
                result-=Polygon(lineC,lineB,lineB-hStep)
                //RemoveTopRight
                result-=Polygon(lineB,lineC,lineC+hStep)
                result-=Polygon(lineC+hStep,lineB+hStep,lineB)
                //CreateReplacementPoints
                result-=Polygon(lineA-hStep,lineC-hStep,lineC+hStep)
                result+=Polygon(lineC+hStep,lineA+hStep,lineA-hStep)
                //UpdateUsagesforNextSteppUses[lineA-hStep]++
                pUses[lineA+hStep]++pUses[lineC-hStep]++pUses [lineC+hStep]++
                pointUses=pUses[:]step+=step
    return result
```

It will be appreciated that the algorithm has an O(n) time complexity because every iteration works on a progressively smaller fraction of points, n/2, n/4, ..., n/n, which is a geometric series that always increases but never actually reaches n.

Camera Enabled Scanners

In this example of the present disclosure, there is provided a system and method of automatically mapping images generated by camera enabled scanners, to their associated point-clouds. Specifically, a number of the latest Laser Scanners incorporate a camera to provide pseudo images by coloring the point-cloud. The present disclosure may be used to map these images to the point-cloud to allow a more seamless rendering than can be obtained by colored points. An additional benefit is provided by allowing an intelligent point reduction algorithm to be used without degrading the rendered scene, which could not be used with the colored point representation without serious visual degradation.

In the following example there is described the existence of a "focal sphere" that represents a sphere which contains the points at which the center of each image will reside (i.e. with the plane of the image tangential to the sphere), and where the image scaling is coincident with the scaling of the point-cloud data from the point of view of the camera. In short, this means that a vector from the camera location a through a given image pixel will intersect the point-cloud where the pixel light originated. The "focal sphere" is related to the camera FOV and is typically a fixed value.

To find the location of an image center on the "focal sphere", given rotation angles $\psi$, $\theta$, $\varphi$ for axes z, y, x, rotation matrices $R_z(\psi)$, $R_y(\theta)$, $R_x(\varphi)$ are combines to give $$R_{zyx} = R_z(\psi)R_y(\theta)R_x(\phi) \quad \text{Eq. 27}$$

$$= \begin{bmatrix} \cos\theta\cos\psi & -\cos\theta\sin\psi + \sin\phi\sin\theta\cos\psi & \sin\phi\sin\psi + \cos\phi\sin\theta\cos\psi \\ \cos\theta\sin\psi & \cos\theta\cos\psi + \sin\phi\sin\theta\sin\psi & -\sin\phi\cos\psi + \cos\phi\sin\theta\sin\psi \\ -\sin\theta & \sin\phi\cos\theta & \cos\phi\cos\theta \end{bmatrix}$$

In the camera coordinates, the view is a vector in the z direction so without loss of generality a camera vector of $C=(0, 0, 1)^T$ is chosen (where T denotes the transpose). The corresponding point on the "focal sphere" can then be found as $$C_{fs} = CR_{zyx}fs \quad \text{Eq. 28}$$

where fs is a scalar that scales the vector in the preceding terms.

The normalized vector can then be found for future calculations as $$C_n = \frac{C_{fs}}{\|C_{fs}\|} \quad \text{Eq. 29}$$

Where $\|.\|$ is the vector norm.

To calculate texture coordinates, the example process finds 2 and 9 orthogonal axes in the plane tangential to the "focal sphere" at the location of the image center. In the camera coordinates the y-axis is vertical so without loss of generality the process forms a vertical vector $V=(0, 1, 1)^T$ and finds the corresponding point on the plane as:

$$V_p = VR_{zyx}\left(\frac{fs}{VR_{zyx} \cdot C_n}\right) \quad \text{Eq. 30}$$

where the bracketed term is a scalar that scales the vector in the preceding terms.

The process then finds the orthogonal axes in the plane tangential to the Focal Sphere. For example, the process finds $\hat{x}$ and $\hat{y}$ orthogonal axes as:

$$\hat{y} = \frac{V_p - C_{fs}}{\|V_p - C_{fs}\|} \quad \text{Eq. 31}$$

where $\|.\|$ is the vector norm.

To find the $\hat{x}$ the process rotates the vertical vector point $V_p$ around the camera axis normal $C_n$ by 90 degrees to give:

$$\hat{x} = \frac{H_p - C_{fs}}{\|H_p - C_{fs}\|} \quad \text{Eq. 32}$$

where, given substitutions $V_p=(x, y, z)^T$, $C_n=(a, b, c)^T$,

Eq. 33

$$H_p = \begin{bmatrix} a(b^2+c^2) + a(-b^2-c^2+ax+by+cz) + (-cb+cy+bz) \\ b(a^2+c^2) + v(-a^2-c^2+ax+by+cz) + (ca-ac+cx+az) \\ c(a^2+b^2) + c(-a^2-b^2+ax+by+cz) + (-ba+a^2-bx+ay) \end{bmatrix}$$

The example process then associates triangles with an image and calculate the corresponding texture coordinates for a surface, in particular, for a given point $P_i$ on a triangle, and camera offset $C_o$, the process can calculate a texture coordinate Ti as:

$$T_i = \begin{bmatrix} PT_i \cdot \hat{x} + \frac{1}{2} \\ PT_i \cdot \hat{y} + \frac{1}{2} \end{bmatrix} \quad \text{Eq. 34}$$

Where vector $$PT_i = \left((P_i - C_o)\frac{fp}{(P_i - C_o) \cdot C_n}\right) - C_{fp}.$$

The example process then tests if either of the x, y components of $T_i$ are less than 0 or greater than 1. In this event the point is outside the image and is not included in the surface. The test continues for all points in the triangle, if all points pass then they are stored with their texture coordinates in the surface and removed from the available points/triangle list. This process is then repeated for n images to produce n surfaces as described, for example, in the example listing in Table 8.

TABLE 8

```
def CreateRotationMatrix( xAngle, yAngle, zAngle ):
    matrix = [0.0] * 9
    b = sin( x_angle )
    a = cos( x_angle )
    d = sin( y_angle )
    c = cos( y_angle )
    f = sin( z_angle )
    e = cos( z_angle )
    matrix[0] = c * e
    matrix[1] = -( c * f )
    matrix[2] = d
    matrix[3] = b * d * e + a * f
    matrix[4] = a * e - b * d * f
    matrix[5] = -( b * c )
    matrix[6] = -( a * d * e) + b * f
    matrix[7] = b * e + a * d * f
    matrix[8] = a * c
    return matrix
def CalcTextureMapping( TextureData, MeshIndex ):
    if len(TextureData) < 6:
        print "Insufficient data for texture, " + len(TextureData) + "\n"
        return
    Offset = Vector3(TextureData[3], TextureData[4], TextureData[5])
    x_angle = -Angle.toRadians(TextureData[0])
    y_angle = -Angle.toRadians(TextureData[1])
    z_angle = -Angle.toRadians(TextureData[2])
    matrix = CreateRotationMatrix( x_angle, y_angle, z_angle )
    normal = Vector3( matrix[2], matrix[5], matrix[8] ).Normalised( )
    sqrtaa = 2.2858996
    centerPointOnPlane = normal * sqrtaa
    verticalPoint = Vector3(
        matrix[1] + matrix[2],
        matrix[4] + matrix[5],
        matrix[7] + matrix[8]
    ).Normalised( )
    lbDotNv = Vector3.Dot( verticalPoint, normal )
    if lbDotNv == 0.0:
        return
    verticalPointOnPlane = verticalPoint * ( sqrtaa / lbDotNv )
    x = verticalPointOnPlane.x( )
    y = verticalPointOnPlane.y( )
    z = verticalPointOnPlane.z( )
    a = normal.x( )
    b = normal.y( )
    c = normal.z( )
    u = a
    v = b
    w = c
    dotp1 = u * x + v * y + w * z
    xd = a * (v * v + w * w)
    xd += u * (-b * v - c * w + dotp1)
    xd += (-c * v + b * w - w * y + v * z)
    yd = b * (u * u + w * w)
    yd += v * (-a * u - c * w + dotp1)
    yd += (c * u - a * w + w * x - u * z)
    zd = c * (u * u + v * v)
    zd += w * (-a * u - b * v + dotp1)
    zd += (-b * u + a * v - v * x + u * y)
    horizontalPointOnPlane = Vector2( xd, yd, zd )
    yVector = (verticalPointOnPlane - centerPointOnPlane).Normalised( )
    xVector = (centerPointOnPlane - horizontalPointOnPlane).Normalised( )
    Index = [ ]
    temptex = [ ]
    triangleOK = False
    for i in range(len(MeshIndex)):
        if i % 3 == 0:
            triangleOK = True
            point = Vertex[MeshIndex[i]] - Offset
            lbDotN = Vector3.Dot(point, normal)
            if lbDotN != 0.0:
                texInt = point * (sqrtaa / lbDotN)
                pVector = texInt - centerPointOnPlane
```

TABLE 8-continued

```
        xCoord = Vector3.Dot(pVector, xVector) + 0.5
        yCoord = Vector3.Dot(pVector, yVector) + 0.5
        temptex[i % 3] = Vector2(xCoord, yCoord)
        if xCoord < 0.0f || xCoord > 1.0f || yCoord < 0.0f || yCoord > 1.0f:
            triangleOK = False
        else:
            triangleOK = True
        if i % 3 == 2 and triangleOK:
            ii = i / 3
            for j in range(3):
                Index.push_back( MeshIndex[ii * 3 + j] )
```

In one example, a number of the currently available laser scanners, for example the Leica C10, are fitted with an internal camera with which the points in the point-cloud can be colored to produce a pseudo-photographic effect. The resulting "image" is limited to the resolution of the scan rather than the image, and hence the user cannot observe the detail provided by traditional photographic sources. For example, to match a sixteen megapixel camera, the scanner would be required to scan sixteen million points in the area covered by a picture. For a 300 mm telephoto zoom lens this equates to a resolution of around 0.2 mm at a distance of 20 m, orders of magnitude better than current scanner technology. It is also an improvement to map the internal camera data to the point-cloud in order to build a surface on which to render the full resolution of the pictures. In addition, this allows the removal of redundant points, as described below, without degrading the rendered scene. This allows for fast and efficient rendering, even on mobile or internet connected devices. Unlike textured surfaces, removal of points is not possible in the "colored points" method, which limits the usability of data across a broad platform of devices.

Images from internal cameras are typically acquired through the mirror system used to launch the laser beam. Post processing software, such as Leica Cyclone, can output not only the images, but also the metadata that describes the orientation and offset of the camera. For the Leica C10 camera the attitude is arranged in a gimbal format i.e. z,y,x rotation order in relation to the coordinate system of the scanner. The effective scaling can be determined from either the field of view (FOV) of the camera, or by matching some non-central image point to the point-cloud. In the invention described herein we find the "focal sphere" where the center point of each image must touch (and the image plane is then tangential to) in order to be projected onto the points in the point-cloud with the correct scaling. For the example Leica Scanstation II described herein, this was found to be a sphere of diameter 2.2858996 m.

Robotic Tripods

In this yet another example use of the present invention, the process may be utilized to map multiple images acquired from robotic tripods, such as a GigaPan, to scan data. In one example, this process may be achieved in three steps; finding the 'focal sphere' where a tangential image has unity dimension, calculating the image center and normal vectors, and calculating the spherical coordinates of each image.

The example process first finds the "focal sphere" radius, fp, representing the distance from the point of acquisition of the images to a sphere where the image size would be unity. For far objects this would be equal to the lens focal length F divided by the image sensor vertical size d. In practice, for nearer objects S1, we have:

$$\frac{1}{F} = \frac{1}{S_1} + \frac{1}{S_2}$$ Eq. 35

$$fp = \frac{(F^{-1} - S_1^{-1})^{-1}}{d}$$ Eq. 36

Here F can be found from the image EXIF information, e.g. 300 mm for a typical telephoto lens. For a full frame DSLR camera d will be around 24 mm. S1 is found by taking the norm of one of the object 3D points.

For the angle of view the process can then determine that:

$$fp = \frac{1}{2\tan\frac{\alpha}{2}} \quad \text{Eq. 37}$$

for $\alpha$ the angle of view.

All mapping calculations require the process to find fp. If the camera parameters are known the process can calculate the focal sphere fp directly. Otherwise the process needs to use known coincident points in both 3D-space and the 2D images and calculate fp. Two example methods are described herein.

In the first example method, if fp is not known the process can calculate it by choosing a non-central point on the image, PP, that is coincident with a point-cloud point DP. Given a point at the center of the image $CP=(0.5, 0.5)^T$ the process can use the sine rule to find $$fp = \|CP - PP\|\left(\frac{\cos\alpha}{\sqrt{1-\cos^2\alpha}}\right) \quad \text{Eq. 38}$$

where $$\cos\alpha = \frac{DP \cdot C_n}{\|DP\|} \quad \text{Eq. 39}$$

In the second example method, given two 3D points PA and PB with corresponding points on the image with vectors A and B with respect to the image center (normalized to picture dimensions), with length a and b respectively. The angle between the vectors satisfies the equation $$\cos\psi = \frac{PA \cdot PB}{\|PA\|\|PB\|} \quad \text{Eq. 40}$$

As such, the process defines the vector to the center of the image as PC with length fp, then $$\cos\psi = \frac{(PC+A)\cdot(PC+B)}{\sqrt{PC\cdot PC + a^2}\sqrt{PC\cdot PC + b^2}} \quad \text{Eq. 41}$$

$$= \frac{PC\cdot PC + PC\cdot B + PC\cdot A + A\cdot B}{\sqrt{PC\cdot PC + a^2}\sqrt{PC\cdot PC + b^2}} \quad \text{Eq. 42}$$

$$= \frac{f_p^2 + A\cdot B}{\sqrt{(f_p^2+a^2)(f_p^2+b^2)}} \quad \text{Eq. 43}$$

which yields $$\cos^2\psi = \frac{(f_p^2 + A\cdot B)^2}{(f_p^2+a^2)(f_p^2+b^2)} \quad \text{Eq. 44}$$

$$= \frac{f_p^4 + 2A\cdot Bf_p^2 + (A\cdot B)^2}{f_p^4 + (a^2+b^2)f_p^2 + a^2b^2} \quad \text{Eq. 45}$$

then $$(\cos^2\psi - 1)f_p^4 + \quad \text{Eq. 46}$$
$$(\cos^2\psi(a^2+b^2) - 2A\cdot B)f_p^2 + \cos^2\psi a^2b^2 - (A\cdot B)^2 = 0$$

which can be solved using standard quadratic techniques known to one of ordinary skill in the art.

To calculate the image center and normal vectors, the process requires the vector to the center of at least one image be known to align the image data to the scan data. In this example, at least one of three methods may be used to determine this.

In a first example, the center and normal vectors are calculated given two arbitrary points on the image. To find the normal vector, the process can find the center vector by solving the equation set $$PC \cdot PA = \frac{fp}{\sqrt{fp^2 + a^2}}\|PA\|fp \quad \text{Eq. 47}$$

$$PC \cdot PB = \frac{fp}{\sqrt{fp^2 + b^2}}\|PB\|fp \quad \text{Eq. 48}$$

$$\|PC\| = fp \quad \text{Eq. 49}$$

then the normal vector N is $$N = PC\frac{1}{\|PC\|} \quad \text{Eq. 50}$$

It will be noted that this result does not guarantee (or require) that the image is vertical.

In a second example, the center and normal vectors are calculated given one vector and the focal sphere. In this example, the process first finds the vector in the image plane P AP coinciding with the known vector PA $$PAP = PA\frac{\sqrt{fp^2+a^2}}{\|PA\|} \quad \text{Eq. 51}$$

Then, the process finds a vertical vector in the image plane PVP coinciding with the y-coordinate of the known vector, noting that it shares a plane in the z-axis with this vector. This yields equations $$PVP \cdot PAP = fp^2 + A_y^2 \quad \text{Eq. 52}$$

$$\|PVP \times PAP\| = A_x(fp^2 + A_y^2) \quad \text{Eq. 53}$$

$$PVP_z = PAP_z \quad \text{Eq. 54}$$

where A. is the coordinate length in the image plane for PA. These equations can be solved simultaneously for PVP. As will be noted, this yields two results, the correct one can be selected using the identity $$\|PVP\| = fp^2 + A_y^2. \quad \text{Eq. 55}$$

Resulting in three equations in PC $$PC \cdot PAP = fp^2 \quad \text{Eq. 56}$$

$$PC \cdot PVP = fp^2 \quad \text{Eq. 57}$$

$$\|PC\| = fp^2 \quad \text{Eq. 58}$$

which can be solved simultaneously for PC. Again, this yields two results. The correct result can be determined by considering the value of the z component in relation to the z component of PA utilizing the process of Table 9, assuming z(1) is the first result for the z-coordinate and z(2) the second.

TABLE 9

```
//coords reversed as from TLHC, so A(2) < 0 means PAP above center!
if(A(2)<0){
    //if zccord positive then PAP or PVP z coord > PC z coord
    if(PAP(3) > z(1)){
        PVP_z = z(1);
    }else{
        PVP(3) = z(2);
    }
}else{
    //if zccord negative then PAP or PVP z coord < PC z coord
    if(PAP(3) < z(1)){
        PVP(3) = z(1);
    }else{
        PVP(3) = z(2);
    }
}
```

As previously noted, the normal vector N is then $$N = PC \frac{1}{\|PC\|}.$$ 
Eq. 59

In this case the image will be orientated vertically.

In the third example method, the approximate relative orientation is determined with one vector, given the focal sphere. In this example given the focal sphere fp the elevation of one of the points PA or PB and the y coordinate of that point on the image the process can determine the z and ratio x/y of the center point on the image.

$$\theta_{PA} = \sin^{-1}\left(\frac{-PA_z}{\|PA\|}\right)$$ 
Eq. 60

$$\theta_{DIFF} = \tan^{-1}\left(\frac{IM_y}{fp}\right)$$ 
Eq. 61

$$PC_z = \sin(\theta_{PA} - \theta_{DIFF})fp$$ 
Eq. 62 where $PC_z$ is the center point z element, $IM_y$ is the y coordinate of the vector PA on the image. Similarly, $$\phi_{PA} = \tan^{-1}\left(\frac{PA_x}{PA_y}\right)$$ 
Eq. 63

$$\phi_{DIFF} = \tan^{-1}\left(\frac{IM_x}{fp}\right)$$ 
Eq. 64

$$\frac{PC_x}{PC_y} = \tan(\phi_{PA} - \phi_{DIFF})\cos(\theta_{PA} - \theta_{DIFF}).$$ 
Eq. 65

The process can then use Eqn. (47) to find the x coordinate $$PC_x = \frac{\frac{PC_x}{PC_y}\left(\frac{fp^2\|PA\|}{\sqrt{fp^2 + a^2}} - PA_z PC_z\right)}{PA_y + PA_x \frac{PC_x}{PC_y}}$$ 
Eq. 66 and y coordinate $$PC_y = -\frac{PA_x PC_x - \frac{fp^2\|PA\|}{\sqrt{fp^2 + a^2}} + PA_z PC_z}{PA_y}.$$ 
Eq. 67

It will be noted that this result does not guarantee that the image is vertical.

Once the focal sphere and the image center and normal vectors are calculated, the process can then calculate the image sphere coordinates. In this instance, the process can calculate the spherical coordinates of the main image normal vector. In particular, Given the normal vector n̂ the azimuth (φ) and elevation (θ) can be determined by:

$$\theta = \sin^{-1}(\hat{n}_z)$$ 
Eq. 68

$$\phi = \tan^{-1}\left(\frac{\hat{n}_x}{\hat{n}_y}\right)$$ 
Eq. 69 where the x, y, z suffix represents the individual components of the 3 space vector.

The process can also calculate the elevation and Azimuth steps for overlapping images. For instance, Given that the overlap of two adjacent images is o then the associated angle step $\gamma_\theta$ in elevation is:

$$\gamma_\theta = 2\tan^{-1}\left(\frac{1-o}{2fp}\right)$$ 
Eq. 70

For the associated angle step $\gamma_\varphi$ in azimuth the process can take account of the increase in horizontal overlap with elevation angle. Because the overlap distance is proportional to the radius of the circle that represents the sphere cross section at the given elevation, fp cos(θ) for sphere radius fp, it can be determined that:

$$\gamma_\phi = 2\tan^{-1}\left(\frac{1-\sigma}{2fp\cos\theta}\right).$$ 
Eq. 71

Given the spherical coordinates for the center of each image, relative to the scan data, and the focal sphere diameter allows the process to use the previous methods described herein. Here surfaces are generated and textured with the images to generate a query-able merged data set that can be viewed and manipulated in a virtual 3D-space or printed using emerging 3D color printers. In one embodiment of the invention 3D data is combined with 2D surface images acquired from the same device.

Figure 12A:
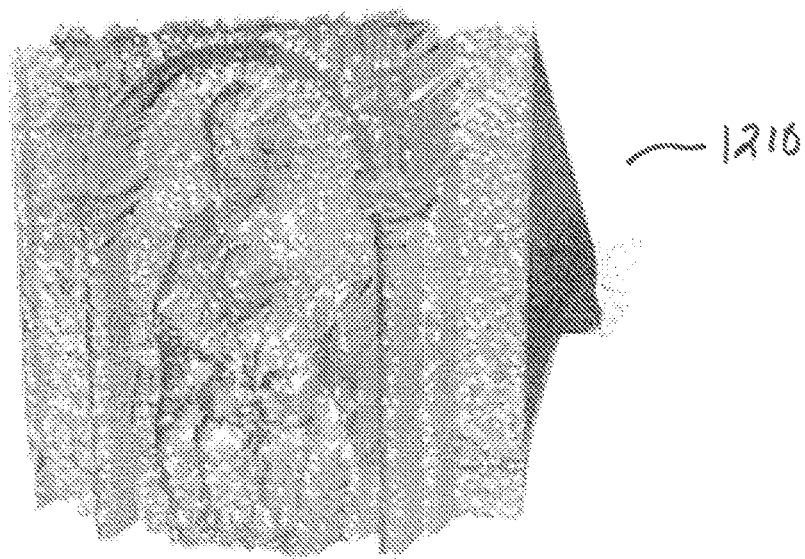
FIG. 12A illustrates an example 3D point-cloud of an architectural object.
Figure 12B:
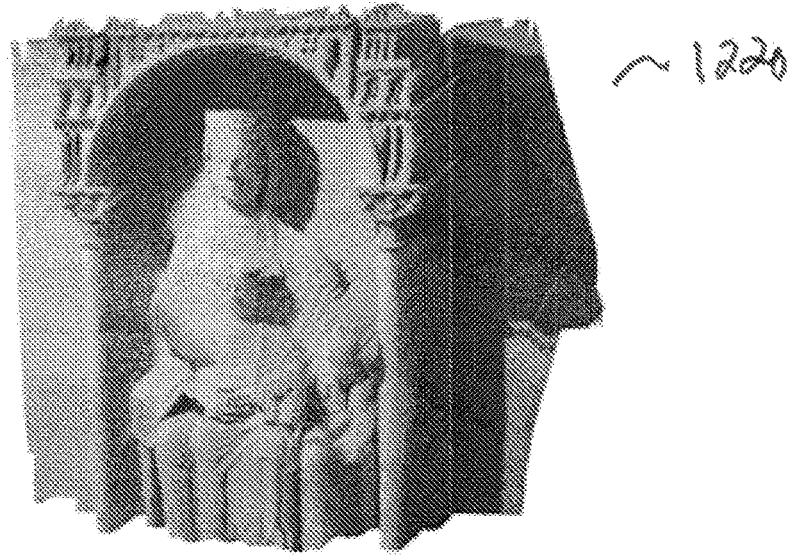
FIG. 12B illustrates the resultant 3D point-cloud of FIG. 12A rendered as a surface utilizing the example methods of the present invention.

Referring to FIGS. 12A and 12B, an example scan of a statue, namely a statute at Bond Hall at the University of Notre Dame has been textured with a photograph of the same statue, taken from the same point as the scanner. A resultant surface 1210 generated from the point-cloud data can be seen in FIG. 12A and a resulting textured surface 1220 can be seen in FIG. 12B.

Figure 13A:
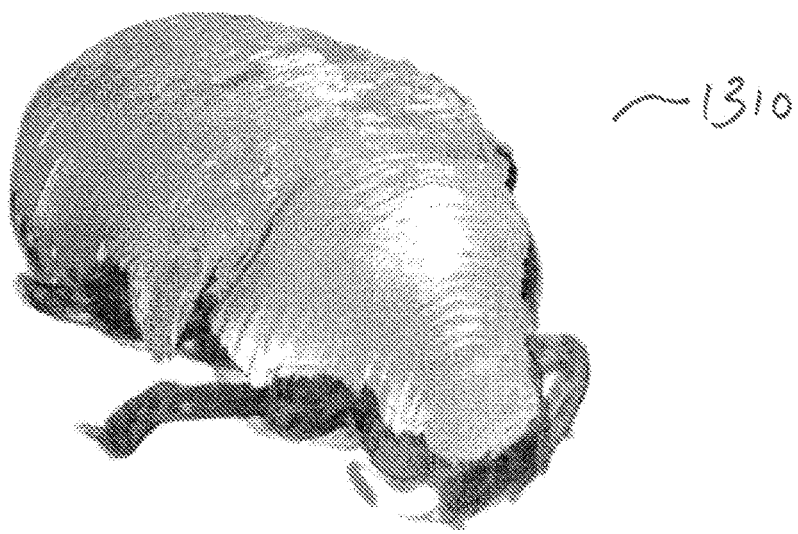
FIG. 13A illustrates an example 3D point-cloud of a CT Scan of an object.
Figure 13B:
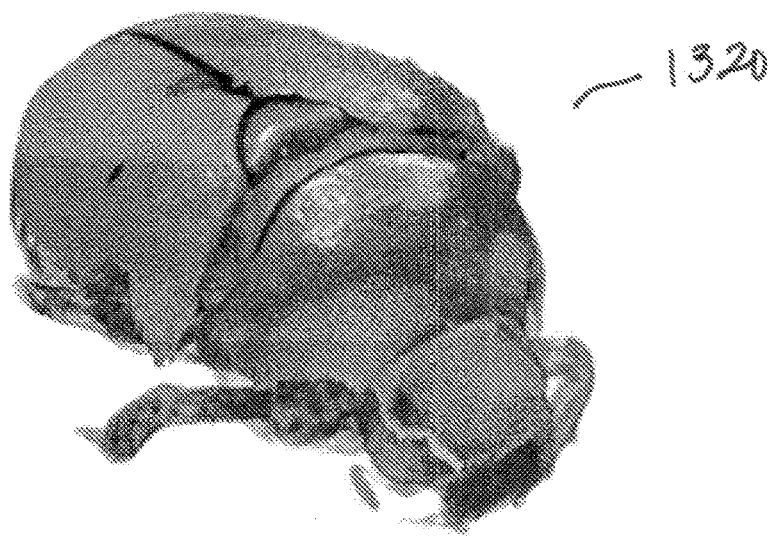
FIG. 13B illustrates the resultant 3D point-cloud of FIG. 13A rendered as a surface utilizing the example methods of the present invention.

Still further, referring to FIGS. 13A and 13B, an example CT scan of a beetle was obtained and a 3D surface point-cloud 1310 was generated from the CT scan data as described hereinabove. A photographic image was used to texture the resulting surface using the processes described herein, and an example resulting image 1320 can be seen in FIG. 13B.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. An automated computer-implemented method of capturing accurately mapped pixel data from a plurality of digital two-dimensional images to coincidental locations on a digital three-dimensional point cloud structure comprising:

capturing electronic data representative of the digital three-dimensional point cloud structure from multiple digital image sensors, wherein an entire scene is captured with a light pulse from each of the digital image sensors, and wherein the captured electronic data includes both accurate data points and spurious data points;

capturing by the digital image sensors, the pixel data from the plurality of digital two-dimensional images;

determining by a processor, coincident points between the pixel data from the plurality of the two-dimensional images and the electronic data representative of the digital three-dimensional point cloud structure, by one of displaying three or more non-coplanar targets inserted within the entire scene and selecting three or more naturally occurring non-coplanar points within the entire scene;

determining by the processor, a scale factor for the pixel data on the plurality of digital two-dimensional images using the determined coincident points and geometry methods;

geometrically mapping by the processor, the pixel data from the plurality of two-dimensional images onto the digital three-dimensional point cloud structure using the scale factor by projecting relative two-coordinate points from the pixel data from the plurality of the two-dimensional images to relative three-coordinate points on a three-dimensional surface of the digital three-dimensional point cloud structure;

creating by the processor, the three-dimensional surface on top of the digital three-dimensional point cloud structure from the multiple digital image sensors and texturing the three-dimensional surface based on the pixel data from the plurality of two-dimensional images;

culling by the processor, the spurious data points by surface and curvature detection and measurement of triangle sizes between corresponding adjacent points on the three-dimensional surface and removing points where the cross-products between two vectors are similar and removing points where the compensated triangle are greater than a threshold; and storing in an electronic database, the three-dimensional surface as electronic data, wherein the mapping of the two-dimensional images on the three-dimensional surface maintains high mapping accuracy at multiple digital resolution models, allowing for a photorealistic model even at both near and distant zoom levels.

2. A method as recited in claim 1, wherein the determination of coincident points comprises the identification of three known coincident points within the entire scene.

3. A method as recited in claim 1, wherein the determination of coincident points comprises the identification of two known coincident points and the calculation of the relative angular orientation of the digital image sensors capturing the pixel data from the plurality of digital two-dimensional images and the digital image sensors capturing the electronic data representative of the three-dimensional point cloud structure.

4. A method as recited in claim 1, wherein the determination of coincident points comprises the input of one known coincident points and the calculation of the relative angular orientation of the digital image sensors capturing the pixel data from the plurality of digital two-dimensional images and the digital image sensors capturing the electronic data representative of the three-dimensional point cloud structure, the focal length of the digital image sensors capturing the pixel data from the plurality of digital two-dimensional images, and the size of the digital image sensors capturing the pixel data from the plurality of digital two-dimensional images.

5. A method as recited in claim 1, further comprising measuring by the processor, at least one of the vertical or horizontal overlap of the pixel data from the plurality of digital two-dimensional images.

6. A method as recited in claim 1, wherein the pixel data captured for the plurality of digital two-dimensional images and the electronic data captured for the digital three-dimensional point cloud structure are obtained from the same location.

7. A method as defined in claim 1, wherein compression of the created three-dimensional surface comprises identification of a plurality of triangles formed on the created three-dimensional surface and combining similarly formed triangles with minimal loss in geometric fidelity.

* * * * *